US012658811B2

(12) United States Patent
Drofenik et al.

(10) Patent No.: US 12,658,811 B2
(45) Date of Patent: Jun. 16, 2026

---

(54) BI-DIRECTIONAL MEDIUM VOLTAGE CONVERTER

(71) Applicant: ABB E-MOBILITY B.V., Delft (NL)

(72) Inventors: Uwe Drofenik, Zürich (CH); Francisco Canales, Baden-Dättwil (CH)

(73) Assignee: ABB E-Mobility B.V., Delft (NL)

(*) Notice: Subject to any disclaimer, the term of this patent is extended or adjusted under 35 U.S.C. 154(b) by 810 days.

(21) Appl. No.: 17/886,286

(22) Filed: Aug. 11, 2022

(65) Prior Publication Data

US 2023/0049948 A1      Feb. 16, 2023

(30) Foreign Application Priority Data

Aug. 13, 2021    (EP) .................................... 21191282

(51) Int. Cl.
H02M 3/335 (2006.01)
H02M 1/08 (2006.01)

(52) U.S. Cl.
CPC ......... H02M 3/33584 (2013.01); H02M 1/08 (2013.01); H02M 3/33573 (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | |
|---|---|---|---|
| 3,659,190 A | 4/1972 | Galluppi | |
| 5,446,642 A | 8/1995 | McMurray | |
| 5,646,833 A | 7/1997 | Gaudreau et al. | |
| 6,043,636 A | 3/2000 | Gaudreau et al. | |
| 9,467,072 B2 * | 10/2016 | Channakeshava .... | H02M 1/126 |
| 10,790,697 B2 * | 9/2020 | Delanoe ................. | H02M 3/24 |
| 2002/0181261 A1 | 12/2002 | Gaudreau | |

(Continued)

FOREIGN PATENT DOCUMENTS

| | | |
|---|---|---|
| CA | 3111189 A1 | 3/2020 |
| CN | 102948055 A | 2/2013 |

(Continued)

OTHER PUBLICATIONS

Biela et al., "Balancing Circuit for a 5-kV/50-ns Pulsed-Power Switch Based on SiC-JFET Super Cascode," *IEEE Transactions on Plasma Science*, 40(10), 2554-2560 (Oct. 21, 2011).

(Continued)

*Primary Examiner* — Jeffrey A Gblende
(74) *Attorney, Agent, or Firm* — McCarter & English, LLP; Michael M. Gnibus

(57) ABSTRACT

A LIT-based bi-directional medium voltage converter topology includes active medium voltage switches that comprise low voltage switches connected in series and/or switch-cells in a cascode-configuration.

15 Claims, 11 Drawing Sheets

(56)  References Cited

U.S. PATENT DOCUMENTS

| | | | |
|---|---|---|---|
| 2005/0180079 A1 | 8/2005 | Gaudreau et al. | |
| 2012/0262220 A1 | 10/2012 | Springett | |
| 2012/0287688 A1 | 11/2012 | Fornage et al. | |
| 2013/0057332 A1 | 3/2013 | Aggeler et al. | |
| 2013/0121043 A1* | 5/2013 | Pietkiewicz | H02M 7/06 |
| | | | 363/40 |
| 2014/0152109 A1* | 6/2014 | Kanakasabai | H02J 9/062 |
| | | | 307/64 |
| 2014/0184309 A1 | 7/2014 | Steeneken et al. | |
| 2015/0021682 A1 | 1/2015 | Bobde et al. | |
| 2016/0322891 A1 | 11/2016 | Dorsett et al. | |
| 2018/0262117 A1 | 9/2018 | Lu et al. | |
| 2022/0302848 A1* | 9/2022 | Yu | H02M 1/36 |

FOREIGN PATENT DOCUMENTS

| | | | |
|---|---|---|---|
| CN | 103516206 A | 1/2014 | |
| CN | 103856069 A | 6/2014 | |
| CN | 110573372 A | 12/2019 | |
| DE | 3826524 C2 | 3/1995 | |
| WO | WO 01/52415 A1 | 7/2001 | |
| WO | WO 2011/154040 A1 | 12/2011 | |
| WO | WO 2013/045241 A1 | 4/2013 | |

OTHER PUBLICATIONS

Liu et al., "Design and Comparison of Passive Gate Driver Solution for Series-connected Power Devices in DC Circuit Breaker Applications," *2021 IEEE Fourth International Conference on DC Microgrids (ICDCM)*, IEEE, 7 pp. (Jul. 18-21, 2021).

Ren et al., "A Compact Gate Control and Voltage-Balancing Circuit for Series-Connected SiC MOSFETs and Its Application in a DC Breaker," *IEEE Transactions on Industrial Electronics*, 64(10), 8299-8309 (Jun. 2, 2017).

European Patent Office, Extended European Search Report in European Patent Application No. 21191282.9, 9 pp. (Feb. 21, 2022).

Office Action issued in counterpart Chinese Application No. 202210966638.5 dated Dec. 5, 2025.

Search Report issued in counterpart Chinese Application No. 202210966638.5 dated Dec. 5, 2025.

* cited by examiner

Bi-directional low-frequency converter

MV DC+ g1

Circuit symbol for
a p-channel JFET

G       D

S

Circuit symbol for
an n-channel JFET

G       D

S g2

MV DC-

BI-DIRECTIONAL MEDIUM VOLTAGE CONVERTER

CROSS-REFERENCE TO RELATED APPLICATIONS

This patent application claims priority to European Patent Application No. 21191282.9, filed on Aug. 13, 2021, which is incorporated herein in its entirety by reference.

FIELD OF THE DISCLOSURE

The present disclosure relates to a bi-directional medium voltage converter, and a use of an active switch cascode in a bi-directional medium voltage low-frequency converter.

BACKGROUND OF THE INVENTION

For applications as renewables (PV solar, wind), storage (battery, hydrogen, fuel cells), large drives, EV charging and datacenter, where at least several Megawatt of electrical power are involved, the connection to the MV grid is done by a MV-to-LV AC/DC converter with galvanic insulation.

BRIEF SUMMARY OF THE INVENTION

In one general aspect, the present disclosure describes an improved topology of a bi-directional medium-voltage (MV) AC/DC converter with galvanic insulation.

The described embodiments similarly pertain to the bi-directional medium voltage converter and the use of an active switch cascode in a bi-directional medium voltage low-frequency converter. Synergetic effects may arise from different combinations of the embodiments although they might not be described in detail. As is known, the term cascode generally describes a two-stage amplifier that consists of a common-emitter stage feeding into a common-base stage.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

In this disclosure, the following abbreviations are used:

MV Medium voltage (typically 3 kV-50 kV)

LV Low voltage (typically 200 V-1 kV)

LIT Line-Interphase-Transformer (provides phase-shifted three-phase systems without galvanic insulation)

MFT Medium frequency transformer (operating at multiple times the mains frequency)

EV Electric vehicle

HF High frequency (multiple times the mains frequency, e.g. 5 kHz-30 kHz)

AC Alternating Current

DC Direct Current

The disclosure describes a converter topology with reduced cost, which may be about 30%, reduced with respect to the state-of-the-art topologies, and a reduced size and weight, which may be reduced by about a factor of three.

According to a first aspect, a bi-directional medium voltage converter for a LIT-based bi-directional medium voltage converter topology is provided. The bi-directional medium voltage converter comprises active medium voltage switches comprising low voltage switches connected in series and/or switch-cells in cascode-configuration.

BRIEF DESCRIPTION OF THE SEVERAL VIEWS OF THE DRAWING(S)

DETAILED DESCRIPTION OF THE INVENTION

Figure 1:
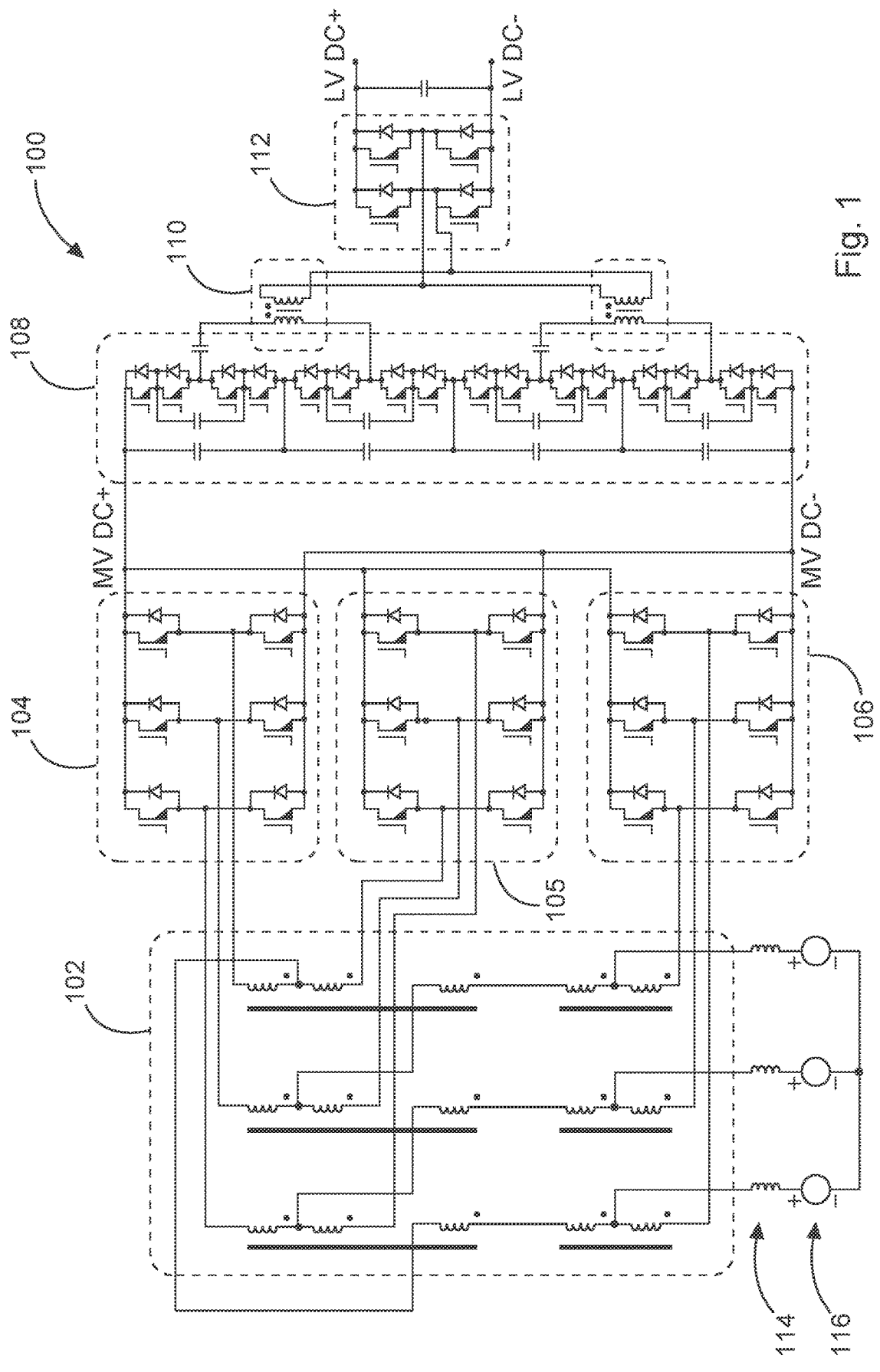
FIG. 1 shows a diagram of a bi-directional converter as modified unidirectional converter based on an 18-LIT topology in accordance with the disclosure.

Same reference numerals are used for the corresponding elements across the figures.

A unidirectional converter may employ MV diode half bridges where the diodes can be realized by simple series connected LV diode cells resulting in very low cost. Such a converter might be modified to provide bi-directionality. For that, it would be required that the low-frequency MV converters of the front-end, i.e. the AC part of the converter, employ active switches which can block the full medium voltage of the DC link. Such a solution is shown in FIG. 1. For voltages above 5 kV such switches are usually not commercially available and/or heavily over-dimensioned in terms of current, resulting in very high cost which makes the topology economically unattractive. Another solution would be to employ series connected cells with active LV switches. Such a configuration, however, is complex and requires a large number of gate drivers insulated for MV, which increases the cost significantly, and furthermore, a complex (cost, reliability, space requirement) voltage balancing network is required.

FIG. 1 shows a diagram of a bi-directional converter 100 as a modified version of the above-mentioned unidirectional converter based on 18-pulse LIT 102 with a connection to the AC grid phases 116 over inductances 114. The bi-directionality is enabled by using switches in the converters 104, 105 and 106. This bi-directional MV AC/DC version of a converter hence comprises, besides the 18-pulse LIT 102, three parallel bi-directional low-frequency MV converters 104, 105, 106 employing IGBTs with anti-parallel diodes, and two MFTs 110 in the galvanic insulated DC/DC converter 108. The MFTs are connected to an H-bridge 112 that provides LV DC+ and LV DC− as output or uses LV DC+ and LV DC− as input, depending on the operation mode, i.e. the direction of the conversion.

Figure 2A:
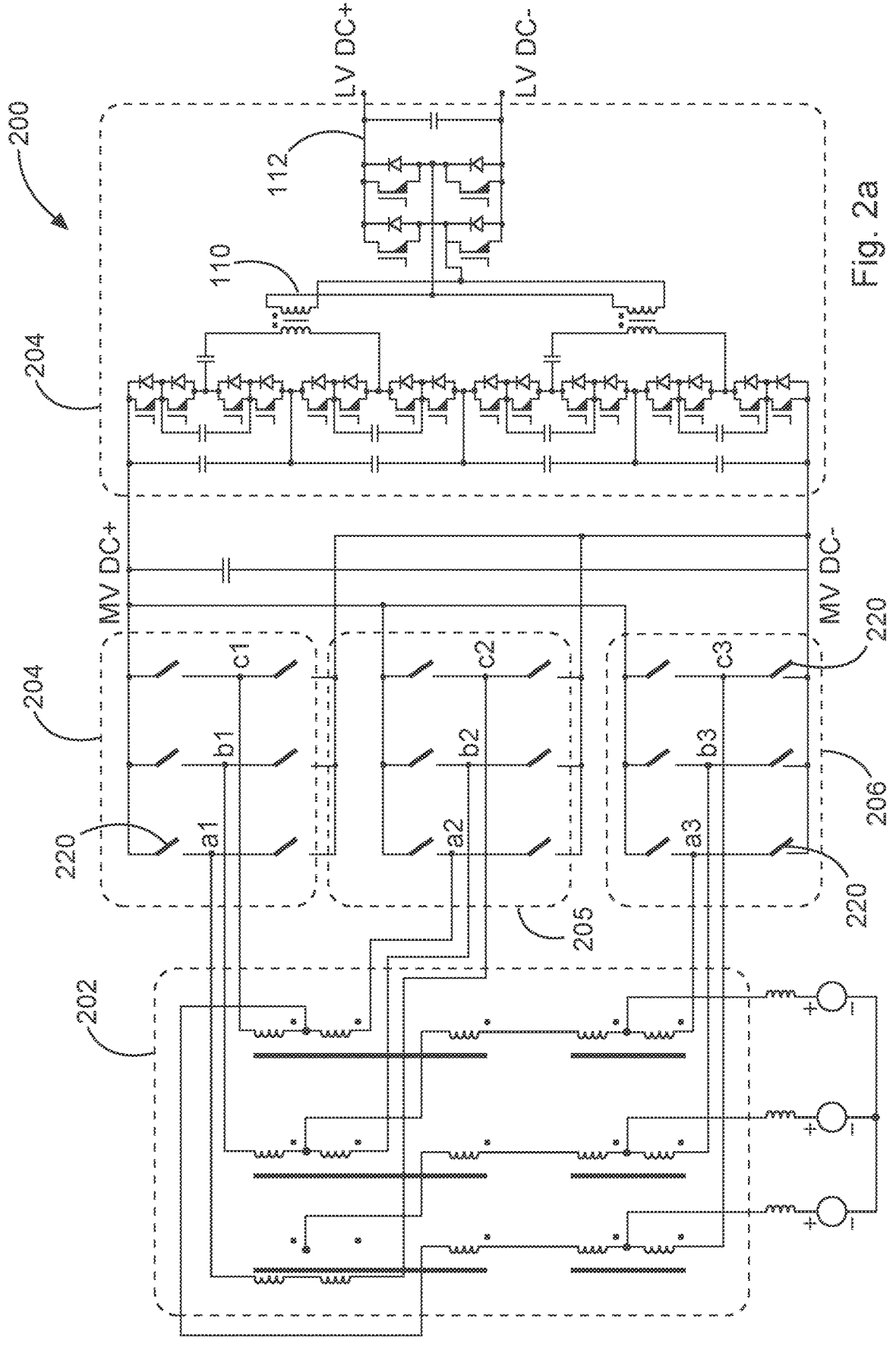
FIG. 2a shows a block diagram of a generalized bi-directional MV AC/DC converter 200 based on an 18-LIT topology in accordance with the disclosure.

FIG. 2a shows a diagram of a generalized bi-directional MV AC/DC converter 200 based on a 18-pulse LIT topology 202. In general, the converter may be based on an n-pulse LIT topology. The switching devices shown in FIG. 1 have been removed and replaced by ideal switch symbols 220 that represent active medium voltage switches 220. The converters 204 . . . 206 are parallel-connected with each other such that a medium voltage DC link is obtained. Each converter 204 . . . 206 has a three half bridges, each half bridge having a midpoint. The converters 204 . . . 206, i.e., the switches 220 of the converters, operate at a low frequency. The LIT comprises inductances that divide each of the three AC phase signals a, b, c at the input of the topology into nine signals. The signals of each AC phase a, b, c, are phase shifted by a configured amount such that the output signals for each phase a1, a2, a3; b1, b2, b3, c1, c2, c3 are phase shifted against each other. These signals are input to the converters 204 . . . 206, such that each converter receives three phase shifted signals a1, b1, c1 of the AC signals a1, a2, a3. Each of the lines from the LIT carrying the one of the respective phase shifted signals a1, b1, c1 is connected to one of midpoints of converter 204. The same applies correspondingly to the signals a2, b2, c2 and a3, b3, c3, that are received by converters 205 and 206, respectively. The DC output at lines MV DC+ and MV DC− of the converters 204 . . . 206 is the input of the DC/DC converter 208. The DC/DC converter 208 comprises transistors connected in series including anti-parallel diodes and balancing capacitor network for balancing the voltage between the transistor stages. The DC/DC converter 208 further comprises two transformers tapping a voltage between transistor stages of the transistors arranged in series and hence isolating the output voltage at lines LV DC+ and LV DC− galvanically. It is noted that the number of transformers of DC/DC converter 208 can be any number of transformers, typically 2-4 if the grid is around 10 kV.

The realizations of the generalized bi-directional converters 204 . . . 206 are presented in the following.

Figure 2B:
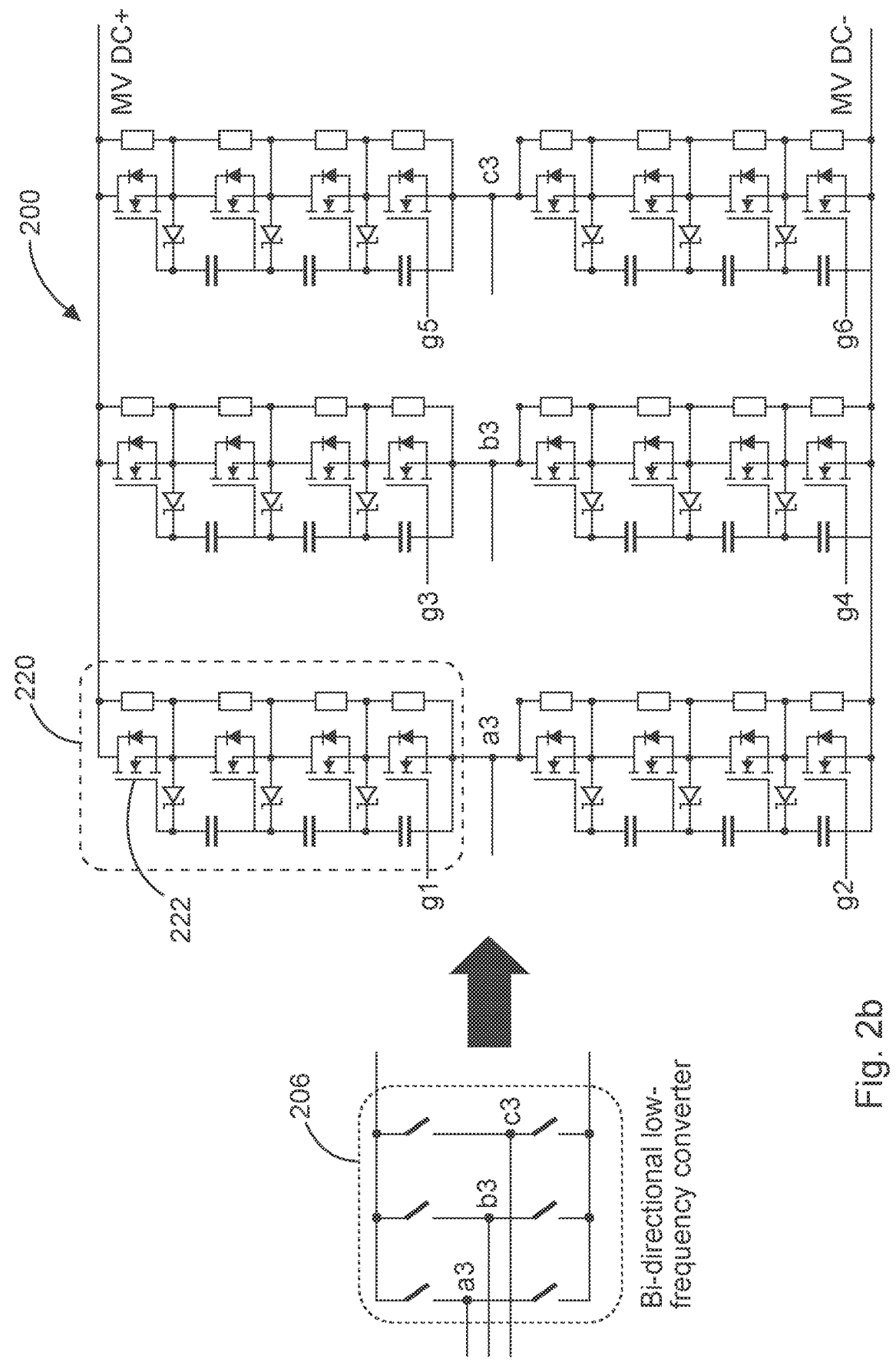
FIG. 2b shows a diagram of realization of the switch symbols at hand of one of the bi-directional low-frequency converters in accordance with the disclosure.

FIG. 2b shows the realization of the switch symbols at hand of one of the bi-directional low-frequency converters 204 . . . 206. The active medium voltage switches 220 are realized by switch-cells 222 in cascode-configuration, i.e. a series-connection of switch cell 222. Each active medium voltage switch 220, i.e. cascode, receives a single switching input signal g1 . . . g6 for the whole cascode 220.

Figures 3A, 3B:
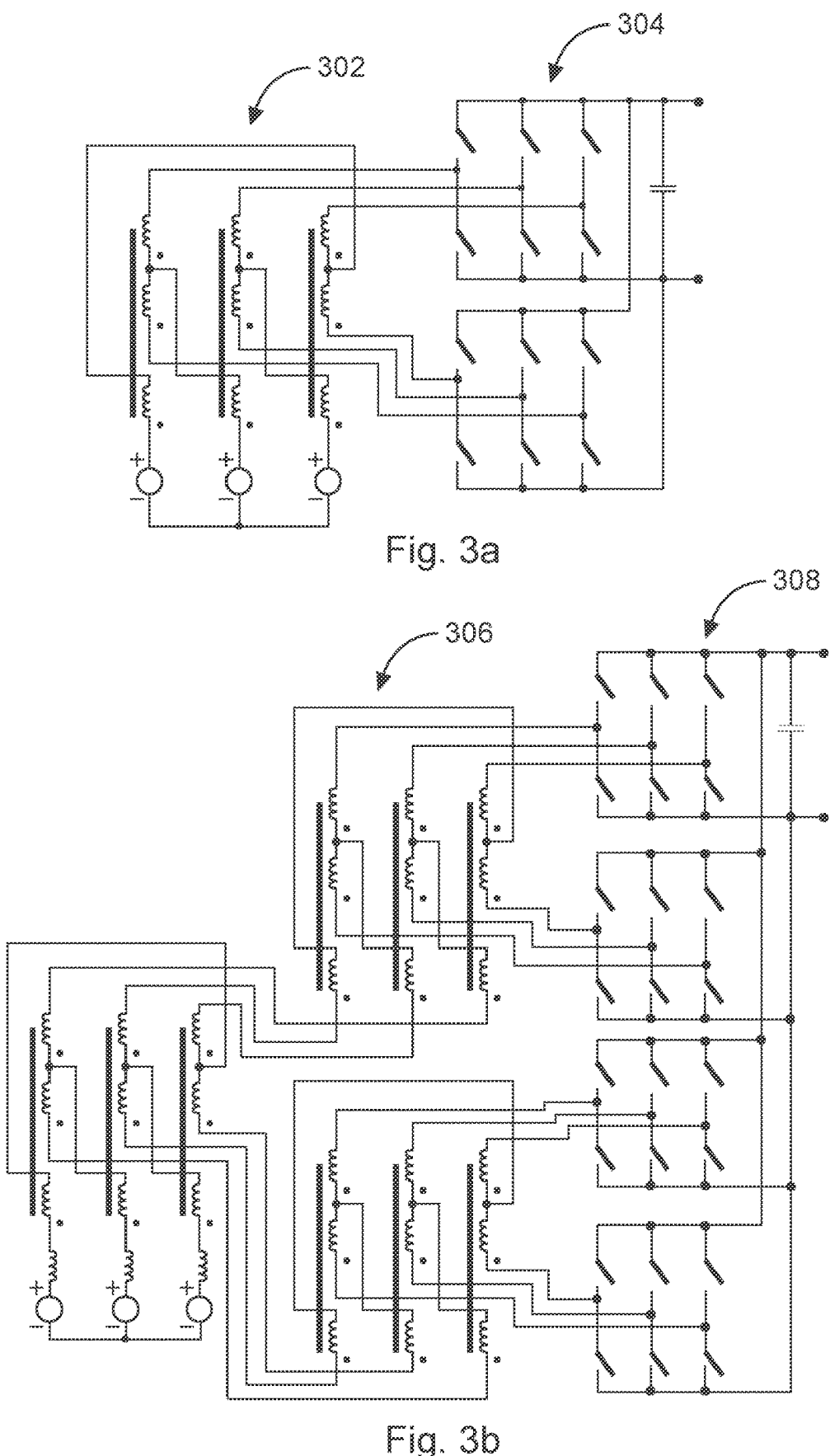
FIG. 3a shows a 12-pulse LIT in accordance with the disclosure.
FIG. 3b shows a 24-pulse LIT in accordance with the disclosure.

FIG. 3a shows further examples of LIT converter configurations 302 and 306 to which the MV converters 304 and 308, respectively, may be applied. FIG. 3a shows a 12-pulse LIT 302 and FIG. 3b shows a 24-pulse LIT 308. Other configurations are possible.

Figure 4A:
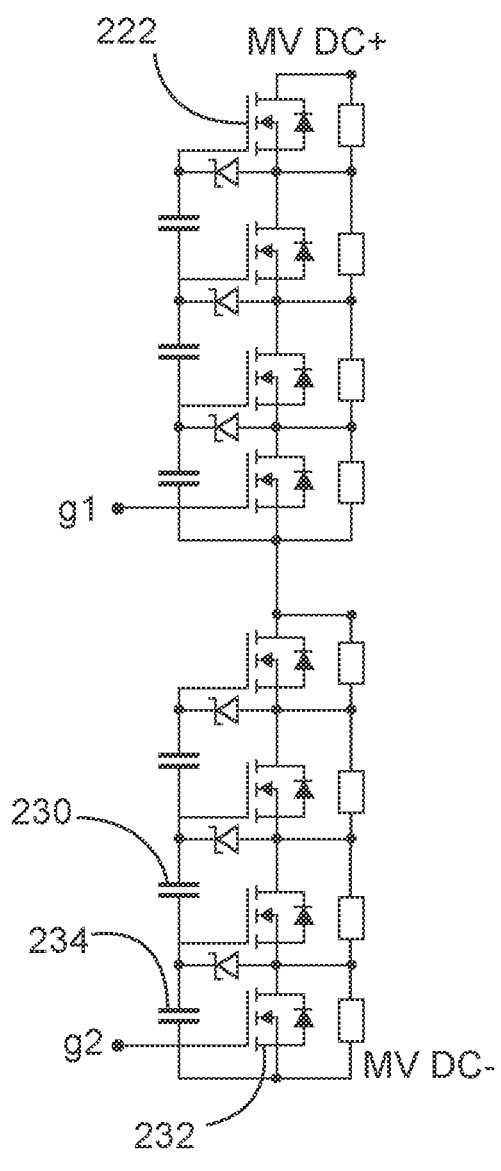
FIG. 4a shows a diagram with a realization of the cascodes with MOSFETS or IGBTs in accordance with the disclosure.
Figure 4B:
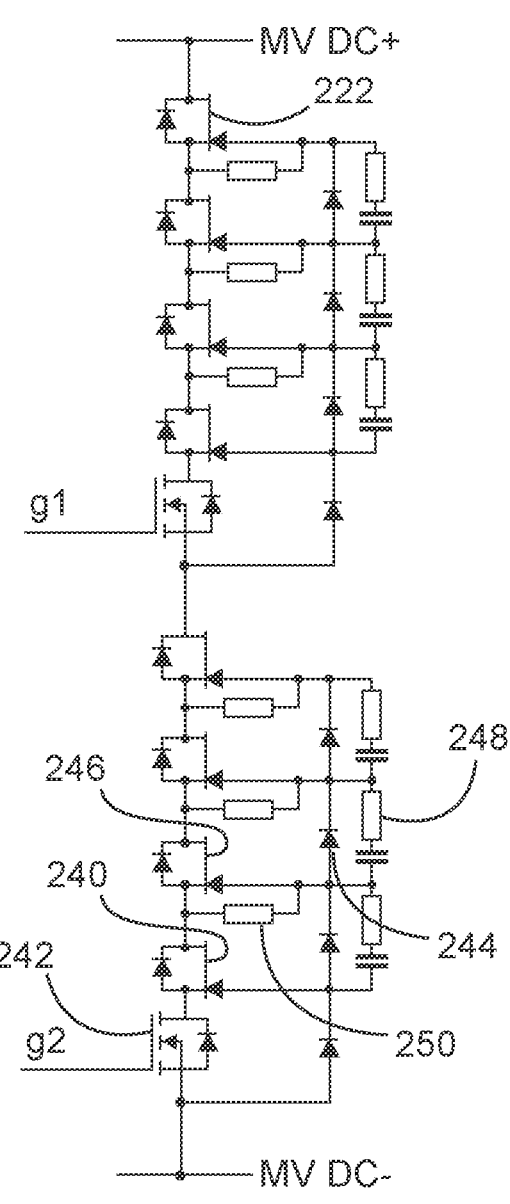
FIG. 4b shows a diagram with a realization of the cascodes with JFETs in accordance with the disclosure.

FIG. 4a shows the realization of the cascodes with MOS-FETS or IGBTs and FIG. 4b with JFETs. The MOSFETs or IGBTs of switch-cells 222 are series-connected. Referring to FIG. 4a, the drain and the source of each MOSFET or IGBT are connected via a voltage-balancing network consisting of capacitors and resistors. The gate and source of each MOS-FET or IGBT are connected using Zener-diodes, and the gate of each MOSFET or IGBT is connected via capacitor 230 to the gate of its upper MOSFET or IGBT with exception of the lowest MOSFET 232, where the Gate takes the switching input signal g2 and the capacitor 234 connected to the gate of the upper MOSFET is directly connected to the Source of the lowest MOSFET 232.

The corresponding cascoded normally-on JFET configuration is shown in FIG. 4b. The JFETs 240 are series-connected, and the gate of each JFET, e.g. 240, is connected to the gate of its upper JFET, e.g., JFET 246 via a diode, e.g. 244, which is optionally in parallel with a voltage-balancing network 248, and the drain of each JFET is connected to the gate of its upper JFET via a resistor 250, and a drain of a single MOSFET 242 (or IGBT) at the very bottom of the configuration is connected to the source of its upper JFET 240, while the source of this MOSFET 240 is connected to the gate of its upper JFET 246.

In this cascode configuration, there is only one switching signal for a whole medium voltage switch. In the shown configuration with N-channel switching devices, this signal is provided to only the lowest switch 232, 242.

Figure 5:
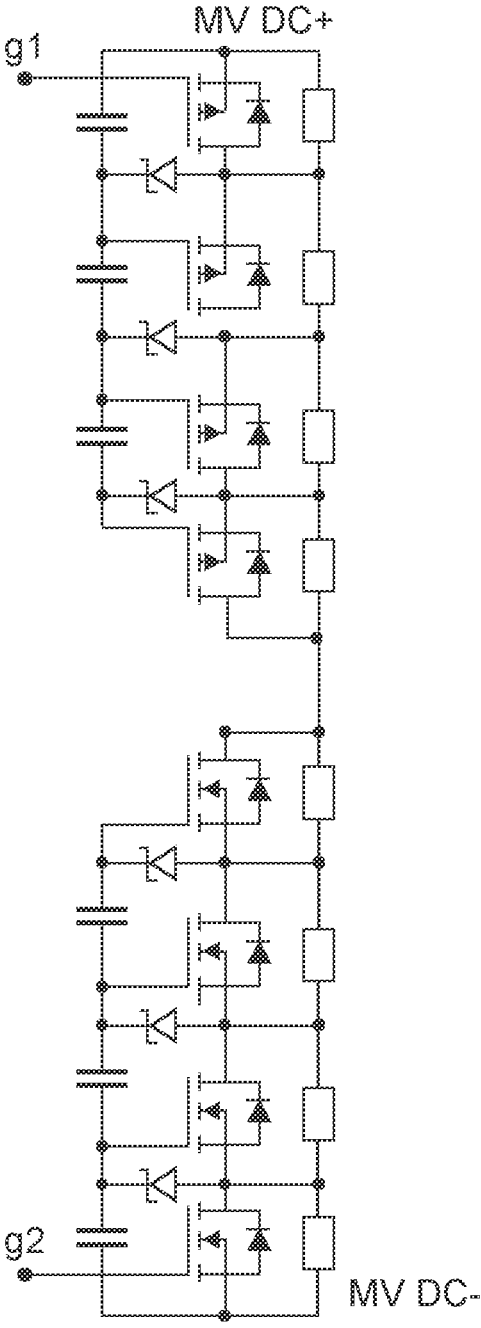
FIG. 5 shows a diagram with a half bridge leg where the MV switch is realized as MOSFET-cascode in accordance with the disclosure.
Figure 6:
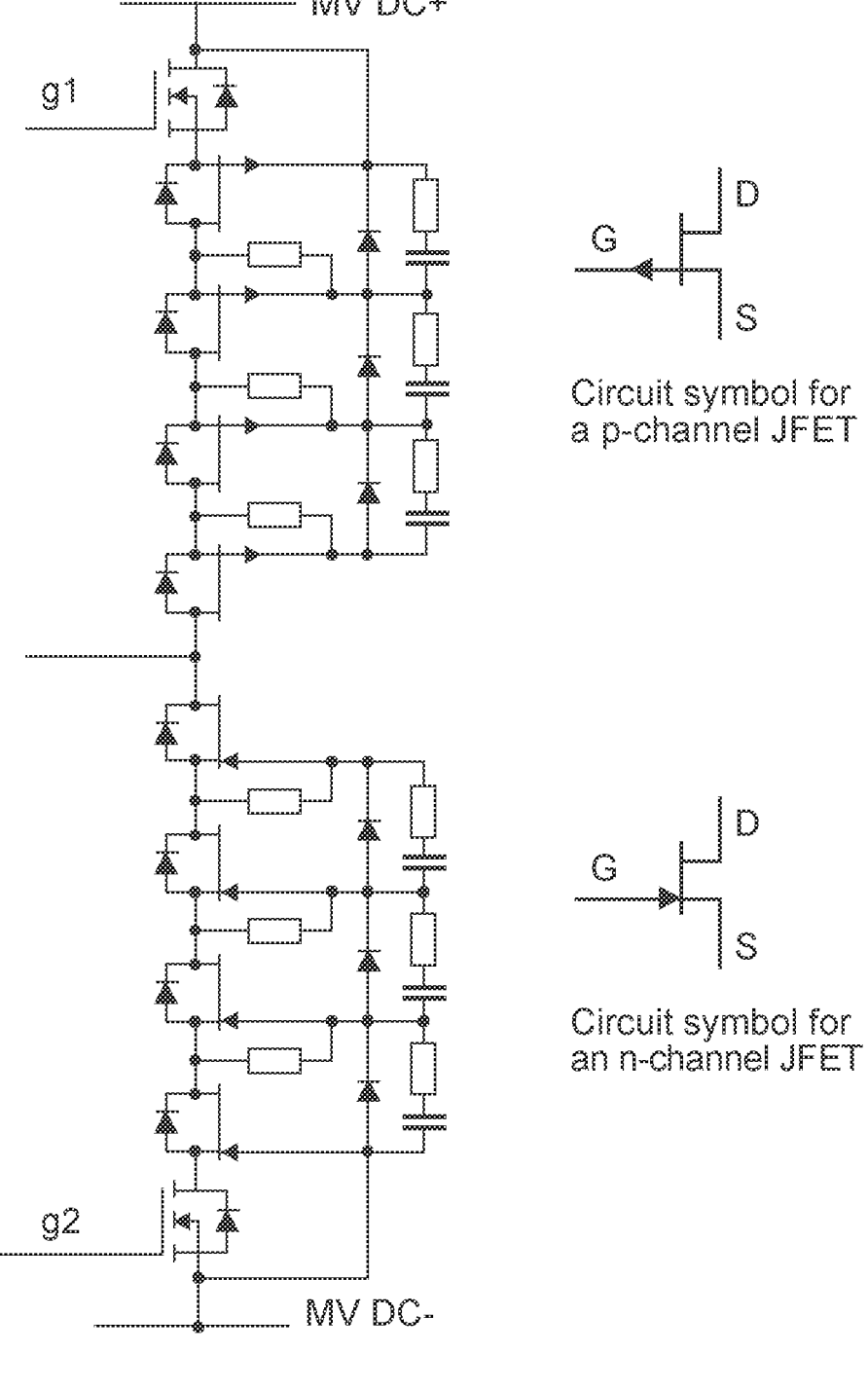
FIG. 6 shows a diagram with a half bridge leg where the MV switch is realized as JFET-cascode in accordance with the disclosure.

FIG. 5 shows a diagram with a half bridge leg where the MV switch is realized as MOSFET-cascode. FIG. 6 shows a diagram with a half bridge leg where the MV switch is realized as JFET-cascode employing normally-on devices and a low-voltage MOSFET. The power semiconductors of the upper cascode switch are of P-channel type, and the power semiconductors of the lower cascode switch are of N-channel type.

Figure 7:
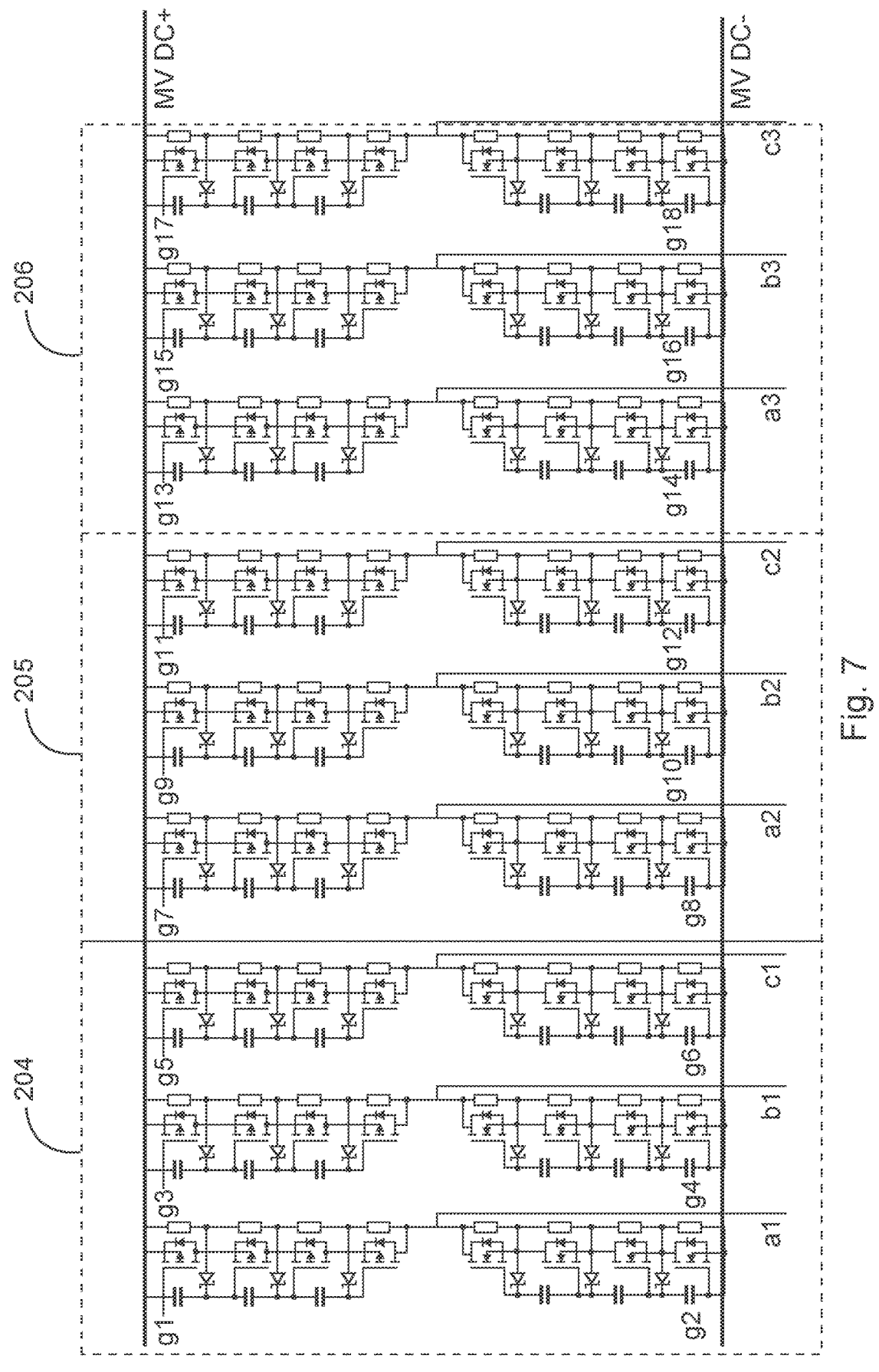
FIG. 7 shows a diagram of a further converter configuration in accordance with the disclosure.

FIG. 7 shows a diagram of a converter configuration where all lower cascode switches of all parallel converters are switched from the negative MV DC link rail without galvanic insulation, and where all upper cascode switches of all parallel converters are switched from the positive MV DC link rail without galvanic insulation. That is, that there is only one single galvanic insulation required, which insulates the negative from the positive MV DC link rail to operate all active cascode switches of all parallel converters.

When building all upper cascode switches with P-channel type semiconductors, and building all lower cascode switches with N-channel type semiconductors, paralleling the three bi-directional low-frequency converters of the 18-pulse LIT converter as shown in FIG. 2a, all lower-cascode-switch gate drivers are on one potential, and all upper-cascode-switch gate drivers are on a different potential, requiring just one single gate driver insulation (medium voltage insulation) for all 18 active cascode switches.

In an embodiment with an 18-pulse LIT front-end as shown in FIG. 2a, there would be three converters in parallel, like the one shown in FIG. 2b, with a total of 18 active cascode switches. For a 24-pulse LIT front-end such as the one shown in FIG. 3b, there would be four parallel converters with a total of 24 active cascode switches which would still just require a single gate driver insulation with a configuration as shown in FIG. 7. This is especially remarkable due to the requirement for MV insulation (e.g. 20 kV).

Figure 8:
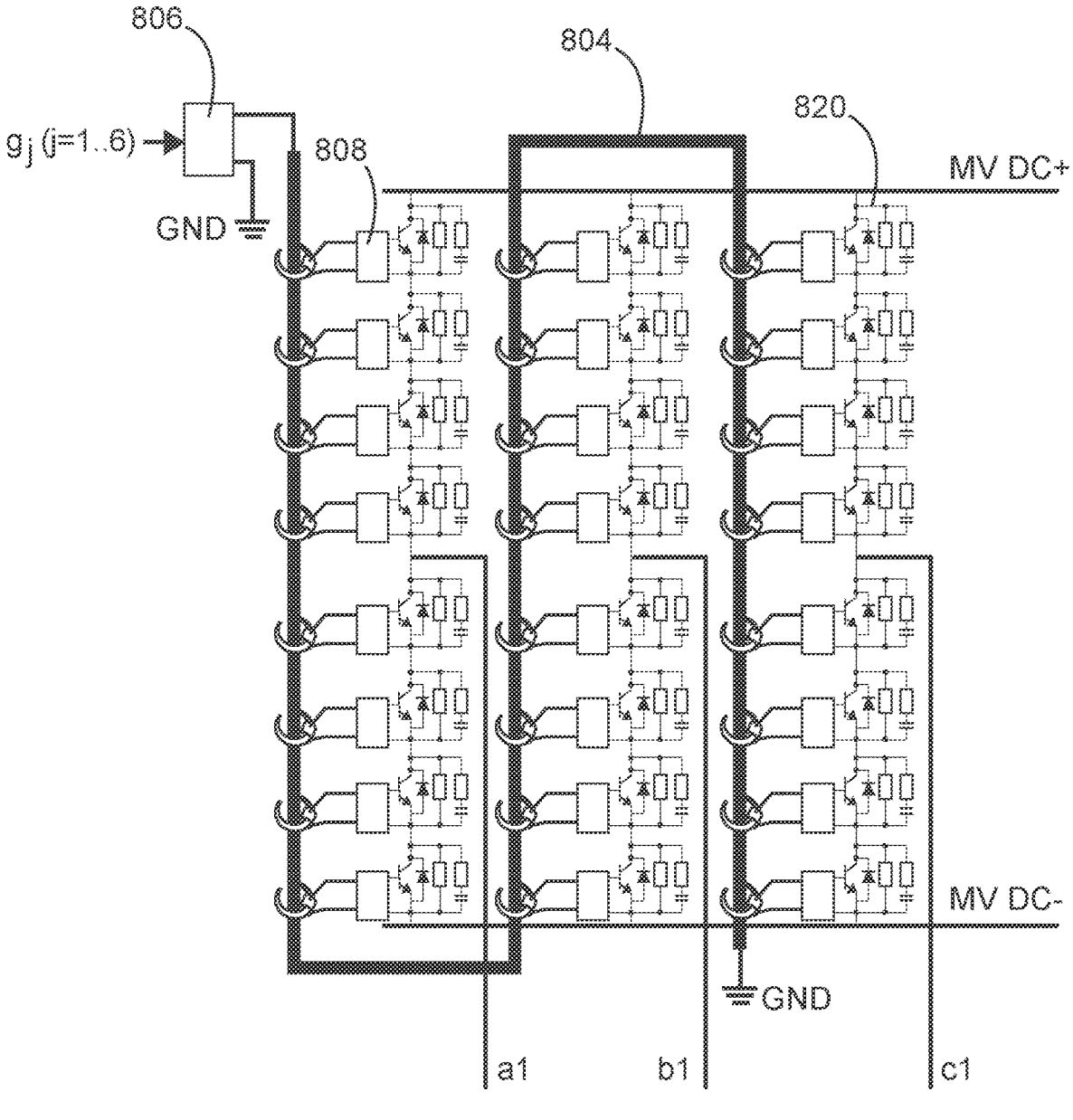
FIG. 8 shows a diagram of a bi-directional medium voltage low-frequency converter in accordance with the disclosure.

FIG. 8 shows a bi-directional medium voltage low-frequency converter according that shown in FIG. 2a. The switches 220 in the example shown in FIG. 8 are realized by series-connected active switches 820 (IGBTs or MOSFETs).

The gate driver power and all gate signals of all six converter switches 820 are provided by one medium voltage insulated cable 804. The gate drivers are coupled inductively to the medium voltage insulated cable, for supplying the gate drivers with power. The current, herein also referred to as AC base signal, through the cable for providing the power to the gate drivers has a certain base frequency and also carries the switching information, which is encoded by a encoder/decoder 808 using a modulation onto the base AC signal. The gate drivers of each switch 820 extract, interpret and execute or apply the modulated signals individually. The distinction or "addressing" may be achieved, e.g. by band pass filtering in case of frequency modulation, thus performing FDMA. The signal encoder/decoder is built into each gate drive to extract the individual switching signal.

Figure 9:
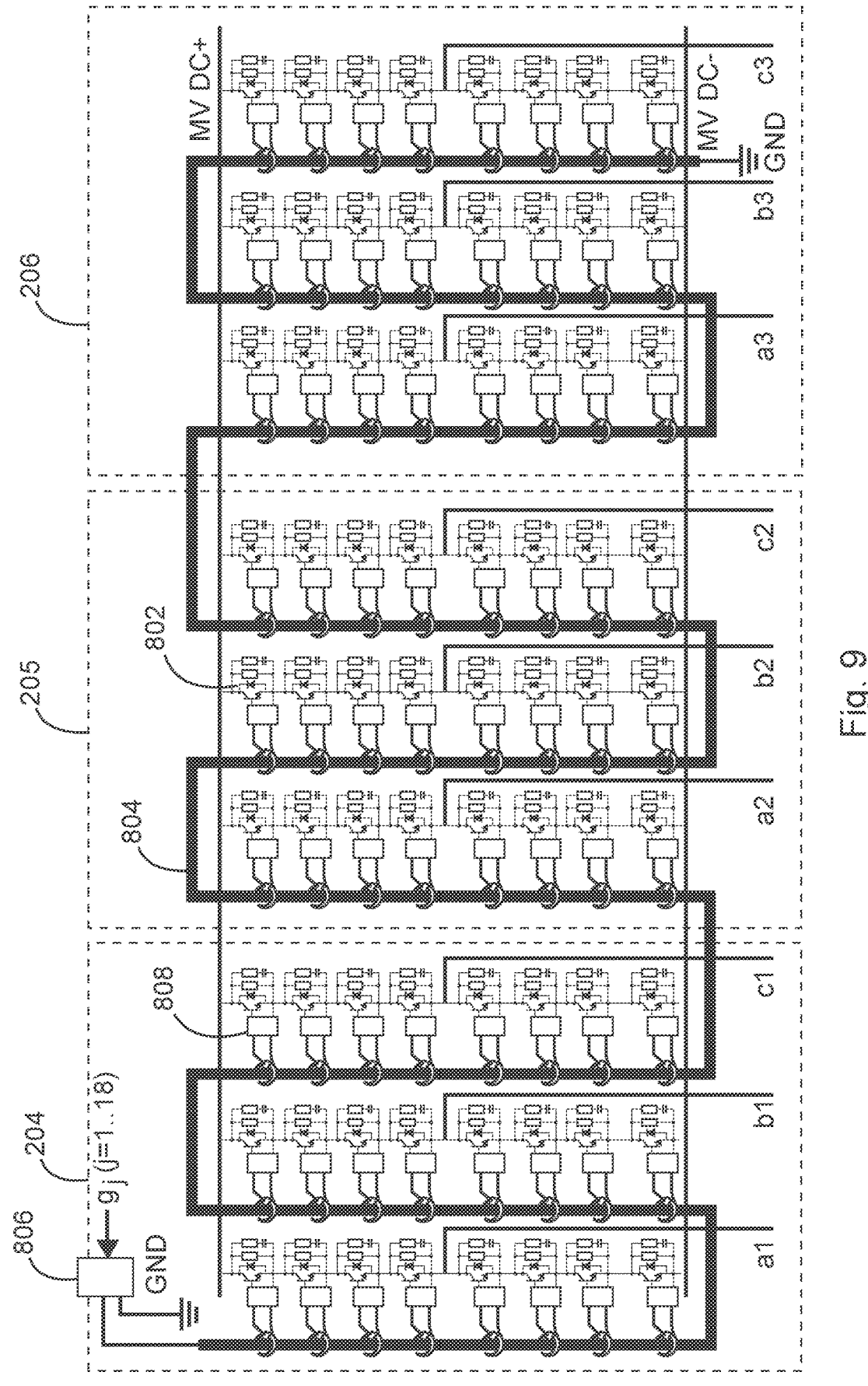
FIG. 9 shows a circuit diagram of the converter that is realized with series-connected active switches in accordance with the disclosure.

FIG. 9 shows a circuit diagram of the converter that is realized with series-connected active switches 802 (IGBTs or MOSFETs) with all three bi-directional medium voltage low-frequency converters for an 18-pulse LIT topography. The gate driver power and gate signals of all switches 802 of all parallel converters are provided by a single medium voltage insulated cable 804 which is fed by an AC generator 806 that encodes all switching information by signal modulation (e.g. different frequency for each switch).

Figure 10:
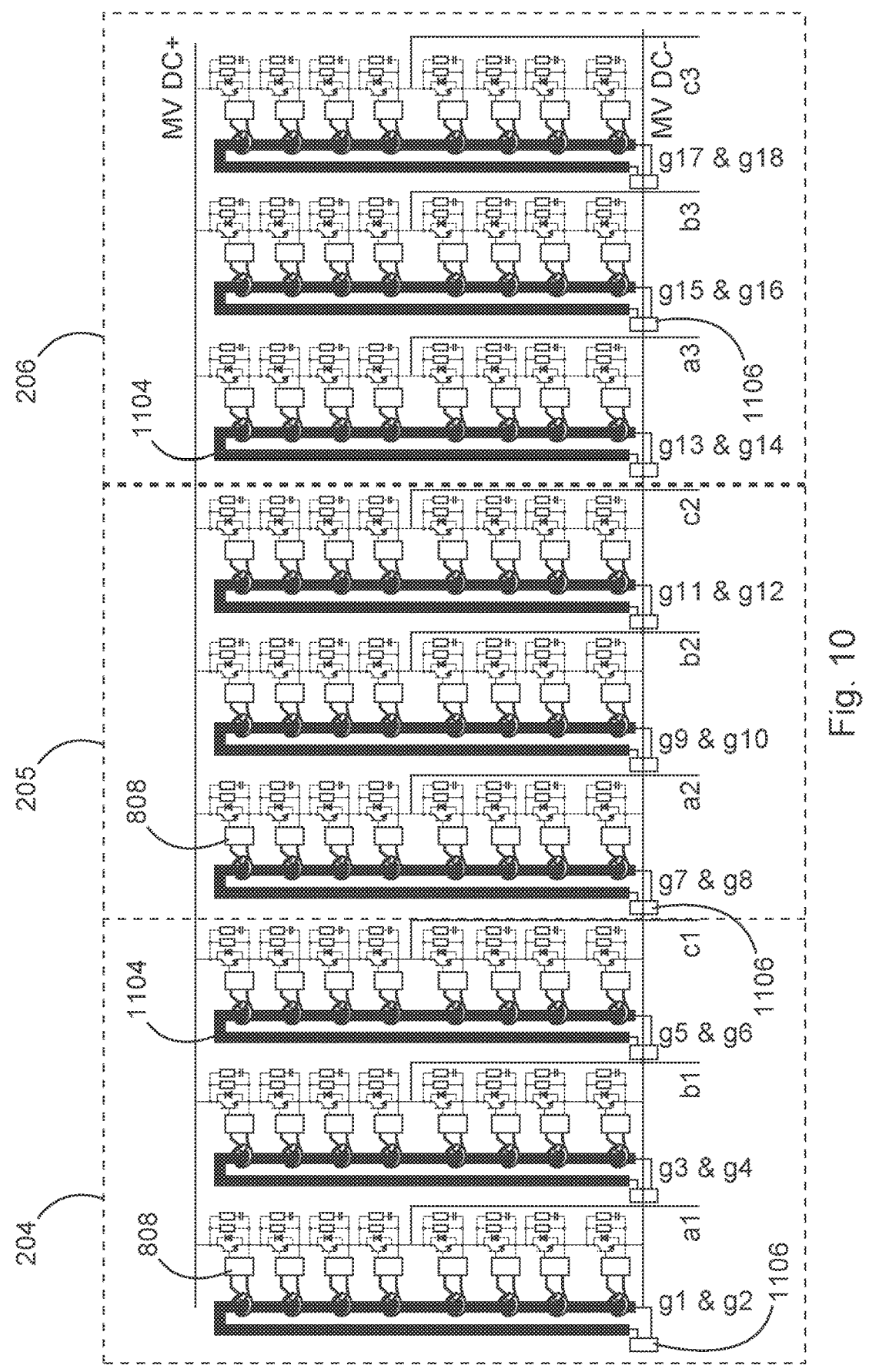
FIG. 10 shows a circuit diagram with the same topology as shown in FIG. 9, however with an alternative gate driver supply and signaling arrangement.

FIG. 10 shows a circuit diagram with the same topology as shown in FIG. 9, however with an alternative gate driver supply and signaling arrangement. Instead of one meandering cable as in FIG. 9, the gate driver power and gate signal of the upper and lower switch configuration are provided by medium voltage insulated cables 1104. There is one cable for each half bridge. Each cable is fed by AC generators 1106 that are all on the same electrical potential (grounding not shown in the figure).

In the foregoing figures, the following reference numerals are used:

100 unidirectional converter based on 18-pulse LIT
102 18-pulse LIT
104 first parallel bi-directional low-frequency MV converter
105 second parallel bi-directional low-frequency MV converter
106 third parallel bi-directional low-frequency MV converter
108 galvanic insulated DC/DC converter
110 MFTs
112 H-bridge connected to LV+/LV− and MFTs
114 inductances to the AC grid
116 AC grid phases
200 bi-directional MV AC/DC converter
202 18-pulse LIT of converter 200
204 first parallel bi-directional low-frequency MV converter of converter 200
205 second parallel bi-directional low-frequency MV converter of converter 200
206 third parallel bi-directional low-frequency MV converter of converter 200
208 DC/DC converter of converter
220 active medium voltage switches/cascode
222 low voltage switch/switch cell (e.g. MOSFE/IGBT/JFET)
230 capacitor
234 capacitor lowest switch
232 lowest MOSFET
240 lowest switch/JFETs
242 MOSFET/IGBT/JFET
244 diode between JFET gates
246 JFET

248 voltage-balancing network
250 resistor
302 example of a 12-pulse LIT converter configuration
304 MV converter for LIT 302
306 example of a 24-pulse LIT converter configuration
308 MV converter for LIT 306
802 series-connected active switches (IGBTs or MOSFETs)
804 single medium voltage insulated cable
806 AC generator
808 signal decoder
820 switch
1104 medium voltage insulated cables
1106 AC generators In this disclosure, the expression "medium voltage switch" is used for a functional switch of a half bridge. With this definition, a half bridge consists of two functional medium voltage switches, an upper switch between a positive line and the midpoint of the half bridge, and a lower switch between the midpoint of the half bridge and a positive line. Each such functional medium voltage switch comprises several physical low voltage switches, which may be connected in series or as a cascode.

Referring to the terms "upper switch" and "lower switch" used in this disclosure, according to technical convention, the circuit diagrams are drawn such that positive line or potential is on the top side of the diagram and minus is on the bottom side of the diagram. Consequently, the series connection of the cells or the cascode is such that an upper switch is nearer to the positive line or potential than a lower switch. The most bottom switch may therefore be connected to a negative rail and the most top switch to a positive rail of the converter.

The LIT and the bi-directional medium voltage converter form a part of the AC-front of the LIT-based bi-directional medium voltage converter topology. Further, such converters may be arranged in parallel to the LIT-based bi-directional medium voltage converter topology. The LIT comprises multiple three-phase systems that are created by the n-pulse LIT-components. The LIT comprises magnetic components configured to be connected to a three-phase AC grid, and the electric part comprises a multi-phase voltage system configured to be connected to a common DC capacitor. The magnetic part is configured to split each AC grid phase n times into two phases, resulting in a plurality of intermediated phases, e.g. (n+1)×3 intermediated phases, each intermediated phase corresponding to a pulse of the multi-pulse line-interphase transformer. The intermediate phases are connected to the bi-directional medium voltage converter.

The medium voltage converters of the AC front end are parallel-connected to each other and to a medium voltage DC link. The medium voltage DC link represents the connection to a DC/DC converter of the bi-directional medium voltage converter topology.

The active switches may be, for example MOSFETSs, IGBTs, JFETs such as SiC-JFETs or any other suitable high power semiconductor.

The arrangement allows for a bi-directional power flow. Further, since the voltage requirements for the switches are low due to the series arrangement, low-cost low-voltage switches can be used in the bi-directional medium voltage converter in simple configurations. The switches are therefore reduced in size and in cost compared to usual converters. Furthermore, such switches are less lossy than usual operation modes, like e.g. PWM. Moreover, the number of gate drivers is significantly reduced and/or the gate drivers can significantly simplified. The reduced number of components and/or simplified gate drivers, effect a low complexity and increased reliability.

According to an embodiment, the medium voltage switches are arranged as half bridges where each half bridge is connected to a LIT AC interface at its midpoint.

The LIT AC interface is the connection between the LIT and the converter. Depending on the number of pulses there may me a plurality of converters connected to the LIT. In case of a direction of the bi-directional medium voltage converter topology from the AC grid to a DC load, this interface connection, i.e. lines of the interface, are an output of the LIT to the converter or the plurality of converters. For the reverse direction, this interface connection is an input from the converter or the plurality of converters to the LIT. These lines from or to the LIT connect the converter(s) that comprise half bridges between a MV DC plus line and a MV DC minus line of the converter or parallel-connected converters at the midpoint of these half bridges. The term "half bridge" is used here for what is sometimes called "half bridge leg". According to this definition, a three phase converter may for example comprise three half bridges.

According to an embodiment, the bi-directional medium voltage converter is configured to be operated at a frequency in the order of a mains frequency.

The bi-directional medium voltage converter topology allows operating the converter at a frequency in the order of a mains frequency. That is, for example, about 50 Hz, instead of a switching frequency in the order of kHz. That is, the converter comprises first low voltage switches, and second, is operated at a low switching frequency. Therefore, the above-mentioned effects can be achieved.

According to an embodiment, the bi-directional medium voltage converter is connected to a 12- 18- 24- 36- or 48-pulse LIT.

In principle, any n-pulse LIT can be used with the bi-directional medium voltage converter presented herein where n is a positive integer number that may be, for example, a multiple of 2×the number of phases. E.g., for three phases and the converter comprising a half bridge for each phase, where a LIT pulse is provided to and received by a midpoint of a half bridge, the total number of pulses of the LIT is preferably a multiple of 6.

According to an embodiment, each of the active medium voltage switches is configured to receive a single switching input signal.

In other words, instead of having a switching input signal for each of the low voltage switches, only one single switching input signal for the whole medium voltage switch is required. A switching input signal may have two levels, and is provided to the gate of the active low voltage switch such as a semiconductor switch. That is, according to this embodiment, a medium voltage converter with three half bridges, one for each phase, receives six switching input signals.

According to an embodiment, the low voltage switches connected in series and/or switch-cells in cascade-configuration of at least one of active medium voltage switches are MOSFETs or IGBTs, wherein for the lowest low voltage switch, a gate is configured to receive the switching input signal and a capacitor connected to a gate of a low voltage switch that is arranged upper to the lowest low voltage switch is directly connected to a source of the lowest low voltage switch. For each further low voltage switch drain and source are connected via a high-impedance voltage-balancing network, gate and source are connected via Zener-diodes, and the gate of each further low voltage switch is connected via a capacitor to the gate of its upper low voltage switch.

The cascode is a possible arrangement, which allows having one single switching input signal for the whole medium voltage switch. The high-impedance voltage-balancing network may comprise for example a resistor and/or a capacitor. Only six gate drivers are required, hence reducing complexity and costs and providing high reliability because often gate drivers are critical concerning reliability.

According to an embodiment, an additional anti-parallel diode is connected to each active switch of the cascode.

According to an embodiment, the low voltage switches connected in series and/or switch-cells in cascade-configuration of at least one of active medium voltage switches are normally-on JFETs except of the lowest low voltage switch, which is a MOSFET, wherein for the lowest low voltage switch, a gate is configured to receive the switching input signal. For each further low voltage switch, a gate of each JFET is connected to a gate of its upper low voltage switch via a diode, and a drain is connected to the gate of its upper low voltage switch via a resistor. A drain of a lowest low voltage switch is connected to a source of its upper low voltage switch, while a source of this lowest low voltage switch is connected to the gate of its upper JFET.

Similar to the MOSFET/IGBT cascode, the JFET cascode requires only one switching signal for the complete medium voltage switch that is applied to the lowest switch. The JFETs may be SiC JFET.

According to an embodiment, a diode is arranged in parallel with a high-impedance voltage-balancing network.

The diode avoids a reverse voltage that may occur at the capacitors of the voltage-balancing network thereby improving the voltage-balancing.

According to an embodiment, the low voltage switches of the half-bridges are N-channel switches.

This configuration allows an identical structure of all medium voltage switches. The use of N-channel switches is more common hence a higher variety of different such switches is available on the market.

According to an embodiment, the lower low voltage switches of the half-bridges are N-channel switches and the upper low voltage switches of the half-bridges are P-channel switches.

The lower low voltage switches are the switches connected to MV DC−, and the upper low voltage switches are the switches connected to MV DC+.

This configuration allows for switching all lower cascode switches of all parallel-connected medium voltage converters at the negative MV DC link rail without galvanic insulation, and switching all upper cascode switches of all parallel converters at the positive MV DC link rail without galvanic insulation. This means that there is only one single galvanic insulation required to operate all active cascode switches of all parallel converters. This insulation is between negative and positive MV DC link rail.

The numbers of series-connected switches for the upper and lower cascode switch may differ. This allows for example the use of P-channel devices with lower voltage ratings.

According to an embodiment, the bi-directional medium voltage converter further comprises a single medium voltage insulated cable, wherein the low voltage switches are arranged as series-connection of switch-cells, and wherein each low voltage switch comprises a gate driver configured to receive gate drive power and a switching signal by inductive coupling with the single medium voltage insulated cable.

The medium voltage switches of this embodiment comprise a series-connection of active low-voltage switches, which employ high-impedance passive networks for voltage-balancing and which have their gate drivers coupled inductively to a medium voltage insulated cable.

According to an embodiment, the individual switch-cell is configured to couple a signal onto the single medium voltage insulated cable for signal processing.

The coupling of a signal onto the single medium voltage insulated cable for signal processing allows, for example, status- and health-monitoring of the cells. Such a monitoring may be performed at the AC signal generator side.

According to an embodiment, the medium voltage insulated cable is configured to supply power for the gate drivers using a base AC signal with a base frequency, and the switching signal comprises switching information that is encoded via modulation onto the base AC signal, and wherein the gate driver of each switch is configured to extract, interpret and execute the modulated signals individually.

The converter topology according to this embodiment comprises one AC generator and a single insulated cable. The AC generator generates an AC signal at a base frequency including switching information modulated on the AC signal. The AC generator provides these signals for all six medium voltage switches over the one insulated cable. This insulated cable then supplies power and the switching information to all gate drivers, i.e. for each low voltage switch, for all parallel-connected medium voltage switches. The gate drivers of each low voltage switch extract, interpret and execute the modulated signals individually, e.g. by performing band pass filtering in case of frequency modulation.

Starting from the AC generator output, the cable may run in current flow direction of one half bridge along the lower and upper switch of a first medium switch converter from DC− to DC+, then run along the neighbor half bridge of the second medium switch converter in opposite direction of current flow from DC+ to DC−. Then it runs again along the next neighbor half bridge of a third medium switch converter in current flow direction DC− to DC+, and so on. Such a meandering cable routing results in a minimum length of the cable through the whole converter configuration allowing reduced complexity and improved power density. The start may also be at the DC+ side and the cable may hence first run along the upper and then the lower switch of the first medium switch converter, the run from DC+ to DC− of the half bridges of the second medium switch converter, etc.

According to an embodiment, the converter further comprises medium voltage insulated cables AC generators that are all arranged on the same electrical potential and that are configured to provide gate driver power and a switching signal for the upper and lower medium voltage switches by the medium voltage insulated cables.

The converter topology according to this alternative embodiment comprises an AC generator and a medium voltage insulated cable to the respective AC generator for each half bridge. The gate driver power and gate signal for the low voltage switches of upper and lower medium voltage switches are provided by the medium voltage insulated cables, which are fed by the AC generators. The generators are all on the same electrical potential. That is, there is one insulated cable for six low voltage switches. Therefore, a simple arrangement of very low complexity is obtained allowing a low cost realization of a bi-directional medium voltage converter with low switching frequency. Further, a high power density is reached and a monitoring can be integrated. For example, cells can send back information about their health status or other information via the MV cable via inductively coupled signals.

According to a further aspect, a use of an active switch cascode in a bi-directional medium voltage low-frequency converter is provided.

According to a further aspect, a use of the bi-directional medium voltage converter as described herein based on a LIT-based bi-directional medium voltage converter topology is provided.

Further, a multi-pulse line-interphase transformer converter comprising a bi-directional medium voltage converter as described herein and a use of such a bi-directional medium voltage converter in a multi-pulse line-interphase transformer converter may be provided. The multi-pulse line-interphase transformer converter comprising LIT may comprise further a DC/DC converter. The LIT comprises magnetic components configured to be connected to a three-phase AC grid, and the electric part comprises a multi-phase voltage system configured to be connected to a common DC capacitor. The magnetic part is configured to split each AC grid phase n times into two phases, resulting in a plurality of intermediated phases, e.g. (n+1)×3 intermediated phases, each intermediated phase corresponding to a pulse of the multi-pulse line-interphase transformer converter. The intermediate phases are connected to the bi-directional medium voltage converter.

These and other features, aspects and advantages of the present invention will become better understood with reference to the accompanying figures and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A bi-directional medium voltage converter for a Line-Interphase-Transformer (LIT)-based bi-directional medium voltage converter topology, comprising:
    a plurality of active medium voltage switches;
    wherein the plurality of active medium voltage switches includes low voltage switches connected in series and/or switch-cells in cascode-configuration, and
    wherein the low voltage switches are connected in series and/or switch-cells in cascode-configuration with respect to at least one of the plurality of active medium voltage switches, and wherein at least one of the plurality of low voltage switches is a Metal-Oxide-Semiconductor Field-Effect Transistor (MOSFET) or an Insulated-Gate Bipolar Transistor (IGBT).

2. The bi-directional medium voltage converter according to claim 1, wherein the medium voltage switches are arranged as half bridges where each half bridge is connected to a LIT alternating current (AC) output at a midpoint of the each half bridge.

3. The bi-directional medium voltage converter according to claim 1, wherein the bi-directional medium voltage converter is configured to be operated at a frequency in an order of a mains frequency.

4. The bi-directional medium voltage converter according to claim 1, wherein the bi-directional medium voltage converter is connected to a 12- 18- 24- 36-or 48-pulse LIT converter.

5. The bi-directional medium voltage converter according to claim 1, wherein each of the plurality of active medium voltage switches is configured to receive a single switching input signal.

6. The bi-directional medium voltage converter according to claim 1, wherein for a lowest low voltage switch, a gate is configured to receive a switching input signal, and a capacitor connected to a gate of a low voltage switch that is arranged upper to the lowest low voltage switch is directly connected to a source of the lowest low voltage switch.

7. The bi-directional medium voltage converter according to claim 6, wherein for each further low voltage switch:
    a respective drain and a respective source are connected via a high-impedance voltage-balancing network;
    a respective gate and a respective source are connected via Zener-diodes; and the respective gate is connected via a capacitor to the gate of the respective gate's upper low voltage switch.

8. The bi-directional medium voltage converter according to claim 1, wherein the low voltage switches are connected in series and/or switch-cells in cascode-configuration of at least one of the plurality of active medium voltage switches are normally-on Junction-Gate Field-Effect Transistors (JFETs) except of a lowest low voltage switch, which is a Metal-Oxide-Semiconductor Field-Effect Transistor (MOS-FET), wherein for the lowest low voltage switch, a gate is configured to receive a switching input signal; and for each further low voltage switch a gate of each JFET is connected to a gate of its upper low voltage switch via a diode, and a drain is connected to the gate of its upper low voltage switch via a resistor; and wherein a drain of a lowest low voltage switch is connected to a source of its upper low voltage switch, while a source of this lowest low voltage switch is connected to the gate of its upper JFET.

9. The bi-directional medium voltage converter according to claim 7, wherein an additional anti-parallel diode is connected to each low voltage switch of a cascode.

10. The bi-directional medium voltage converter according to claim 2, wherein the low voltage switches of the half-bridges are N-channel switches.

11. The bi-directional medium voltage converter according to claim 2, wherein the lower low voltage switches of the half-bridges are N-channel switches and an upper low voltage switches of the half-bridges are P-channel switches.

12. The bi-directional medium voltage converter according to claim 1, further comprising:
    a single medium voltage insulated cable;
    wherein the low voltage switches are arranged as series-connection of switch-cells; and
    wherein each low voltage switch comprises a gate driver configured to receive gate drive power and a switching signal by inductive coupling with the single medium voltage insulated cable.

13. The bi-directional medium voltage converter according to claim 12, wherein each individual switch-cell is configured to couple a signal onto the single medium voltage insulated cable for signal processing.

14. The bi-directional medium voltage converter according to claim 12, wherein the medium voltage insulated cable is configured to supply power for the gate drivers using a base AC signal with a base frequency, and the switching signal comprises switching information that is encoded via modulation onto the base AC signal; and wherein the gate driver of each switch is configured to extract, interpret and execute the modulated signals individually.

15. The bi-directional medium voltage converter according to claim 1, further comprising:
    medium voltage insulated cables; and
    AC generators that are arranged on a same electrical potential, each medium voltage insulated cable coupled to an alternating current (AC) generator, the AC generators configured to provide gate driver power and a switching signal for the upper and lower medium voltage switches by the medium voltage insulated cables.

* * * * *